United States Patent
McGinley

(10) Patent No.: US 7,254,465 B2
(45) Date of Patent: Aug. 7, 2007

(54) NO-BREAK-POWER-TRANSFER CONTROL SYSTEM FOR VARIABLE FREQUENCY ELECTRICAL POWER SYSTEMS

(75) Inventor: Ray M. McGinley, Fountain Hills, AZ (US)

(73) Assignee: Honeywell International, Inc., Morristown, NJ (US)

( * ) Notice: Subject to any disclaimer, the term of this patent is extended or adjusted under 35 U.S.C. 154(b) by 426 days.

(21) Appl. No.: 10/860,851

(22) Filed: Jun. 4, 2004

(65) Prior Publication Data

US 2005/0273206 A1 Dec. 8, 2005

(51) Int. Cl.
*G05D 11/00* (2006.01)

(52) U.S. Cl. .................. 700/295; 700/287; 307/64

(58) Field of Classification Search ............. 700/291, 700/287, 290, 295; 307/84, 85, 86, 87, 64–65, 307/72
See application file for complete search history.

(56) References Cited

U.S. PATENT DOCUMENTS

| | | | |
|---|---|---|---|
| 5,555,151 A * | 9/1996 | Baker et al. ............. | 361/79 |
| 5,627,744 A | 5/1997 | Baker et al. | |
| 5,729,059 A | 3/1998 | Kilroy et al. | |
| 6,256,977 B1 * | 7/2001 | McGinley et al. ........... | 60/786 |
| 6,278,262 B1 * | 8/2001 | Ullyott ................... | 322/22 |
| 6,806,589 B1 * | 10/2004 | Suttie .................... | 307/73 |
| 2002/0074863 A1 | 6/2002 | Turvey | |
| 2003/0179764 A1 | 9/2003 | Gudgeon | |

* cited by examiner

*Primary Examiner*—Zoila Cabrera
(74) *Attorney, Agent, or Firm*—Ingrassia Fisher & Lorenz

(57) ABSTRACT

A method and apparatus for executing a no-break power transfer between an electrical power generator powered by an auxiliary power unit (APU) and an electrical power generator powered by an aircraft main engine. The method comprises sending a power transfer command, a load/unload amplitude signal, and a target frequency signal from a bus power control unit to an APU electronic control unit; deriving a calculated load range for the APU at a new load and frequency operating point; and determining if the new load and frequency operating point falls within the calculated APU load range. If within range, a no-break power transfer is initiated; if not within range, a power transfer with momentary interruption is initiated.

35 Claims, 2 Drawing Sheets

NO-BREAK-POWER-TRANSFER CONTROL SYSTEM FOR VARIABLE FREQUENCY ELECTRICAL POWER SYSTEMS

BACKGROUND OF THE INVENTION

The present invention generally relates to variable-frequency electrical power systems and, more specifically, to a method and apparatus for automatically transferring electrical power between an auxiliary power unit (APU) generator and a main engine generator in such variable-frequency systems.

An APU is a gas turbine engine which can be used to provide electrical power and air conditioning on board an aircraft, as well as for starting a main engine. When the aircraft is being serviced on the ground, an electrical bus in the aircraft electrical system may be connected to a ground-support power supply to provide necessary electrical power to aircraft components. The ground support power supply may be a portable ground cart or a fixed facility power supply. When the aircraft prepares to leave the ground support facility, the source of electrical power may be transferred from the ground-support power supply to an electrical generator powered by the APU in the aircraft. In some applications, ground support power may not be used, and the APU electrical generator may be the sole source of electrical power.

Subsequently, when the aircraft prepares for departure, APU power may be used to start the aircraft main engines. Once the main engines are operating, the source of electrical power may be transferred from the functioning APU electrical generator (i.e., the load-dropping generator) to a main engine electrical generator (i.e., the load-receiving generator). After landing, electrical power may be transferred in the reverse sequence, from the main engine electrical generator to the APU electrical generator, and then from APU electrical generator to the ground support power supply.

As can be appreciated by one skilled in the relevant art, a "no-break" (i.e., uninterrupted) power transfer (NBPT) is preferred when there are power-sensitive components, such as volatile computer memory, which would be affected by a temporary loss of electrical power if the functioning electrical power source is disconnected before a replacement electrical power source is connected. Accordingly, when a "break power transfer" is performed instead of a no-break power transfer, data entered into volatile computer memory, for example, would need to be re-entered. A break power transfer is an acceptable operating sequence, but is less desirable than a no-break power transfer.

In most aircraft which use AC power systems instead of DC systems, the rotational speed of the main engine electrical generator is controlled such that the output power has an essentially constant frequency. Controlling the rotational speed of the main engine electrical generator may be accomplished, for example, by utilizing a mechanical speed-control device between the engine gearbox and the generator. The APU is normally controlled as a fixed-speed engine and therefore the APU electrical generator frequency is also essentially constant. When executing a no-break power transfer, the frequency and other parameters of the load-receiving and load-dropping generators must be closely matched in order to prevent damage to the generators or to the drive train. With constant frequency electrical systems, this operation is relatively straightforward. Prior to the power transfer, the difference in frequency between the APU electrical generator and the main engine electrical generator will be relatively small, since both are controlled to be constant-frequency generators. Additionally, a "target frequency" signal, essentially equivalent to the frequency of the main engine electrical generator, may be sent to an APU electronic control unit which can adjust fuel flow to the APU until the target frequency is realized by the APU electrical generator.

In the present state of the art, some aircraft electrical systems operate with variable-frequency electrical power and control of the rotational speed and output frequency of the main generator may be provided over a wide range of frequencies and speeds. Accordingly, these newer systems may employ a variable-speed APU also having a variable, but more limited, operating frequency range. With the new variable frequency system, designing the APU to transfer a full electrical load at any matching frequency within the entire ground operating frequency range of the main engine electrical generator would significantly penalize the size, weight, and cost of the APU. That is, the APU would have to be larger, heavier, and costlier to be able to accept full load at minimum speed. The APU would also require additional structure and control methods to minimize speed transients and meet containment safety requirements in order to be able to transfer (drop) full load at maximum speed. An APU designed to accommodate the wide frequency range of the main engine generator, and to allow for the worst possible combinations of air pressure (ambient altitude), load, and temperature conditions would be a larger and heavier unit.

U.S. Pat. No. 5,729,059, issued to Kilroy et al., discloses the digital transmission of electrical parameters to minimize wiring between electrical components of a no-break power transfer system. However, in the system taught by Kilroy et al. '059, the APU is capable of power transfers, a typical feature in fixed frequency electrical systems. Accordingly, the system taught by Kilroy et al. '059 does not address variable frequency electrical systems in which a substantial frequency mismatch between load-transferring generators may be present. In the present invention, communication between the aircraft electrical power system and the auxiliary power unit system is implemented such that no-break power transfers may be rendered practical in applications where some of the load-transferring generators operate over a broad frequency range.

As can be seen, there is a need to maintain the ability to execute no-break-power-transfers in variable-frequency electrical systems during most of the normally encountered operating conditions without adding significant size, weight, and cost to the APU.

SUMMARY OF THE INVENTION

The present invention generally provides a method and apparatus for executing a no-break transfer between an electrical generator powered by an auxiliary power unit and an electrical generator powered by an aircraft main engine. The method and apparatus utilize the capability of the APU control system to calculate a new load point for the APU at a new APU speed, where the new speed would allow the APU generator frequency to closely match the main engine or external power generator target frequency. If the new APU load point, requested by the airplane electrical system, can be gracefully accommodated by the APU, the APU speed (and generator frequency) is commanded to the external power generator target frequency and a load transfer is executed with no interruption. If the new APU load point requested by the airplane electrical system cannot be accommodated without risk of underspeed or overtemperature shutdown (for a load application transfer) or overspeed shutdown (for a load removal transfer), then the existing APU speed (and generator frequency) is not altered. In such cases, the electrical load transfer is interrupted because the transfer is being made between sources operating at different frequencies.

In accordance with the present invention, a method for switching electrical power between a main engine generator and an APU generator comprises sending a load/unload amplitude signal, a target frequency signal, and a transfer command signal from a bus power control unit to an APU electronic control unit (ECU); deriving a calculated load range for the APU at the target frequency based on the measured operating conditions; comparing the load/unload amplitude signal with the calculated load range for the APU; if the load/unload amplitude signal is within the calculated load range for the APU, initiating a no-break power transfer; and if the load/unload amplitude signal is not within the calculated load range for the APU, initiating a power transfer with momentary interruption.

In another aspect of the present invention, a method for transferring the source of electrical power between a main engine generator and an APU generator comprises deriving a calculated load range for the APU, the calculated load range being a function of APU operating conditions and the target frequency (APU speed); comparing the calculated load range with the measured electrical power being supplied by the main engine generator; if the measured power signal is within the calculated APU load range, initiating a no-break power transfer from the main engine generator to the APU generator; and if the measured power signal is not within the calculated APU load range, initiating a power transfer with momentary interruption.

In still another aspect of the present invention, a control apparatus comprises a program file including an algorithm, the algorithm for deriving an calculated APU load range from an operating APU inlet air pressure reading, APU inlet air and exhaust gas temperature readings, and an APU shaft rotational speed reading; and an electronic control unit for receiving a load/unload amplitude signal from a bus power control unit, the load/unload amplitude signal being derived from the customary generator voltage and current sensing devices, the electronic control unit further for obtaining the operating ambient air pressure reading, the APU inlet air and exhaust gas temperature readings, and the APU shaft rotational speed reading, the electronic control unit further for calculating the APU load range from the program file and for generating a no-break power transfer confirmation signal.

In another aspect of the present invention, a control apparatus comprises a load range database for deriving an APU load range from an operating APU inlet air pressure reading, APU inlet air and exhaust gas temperature readings, and an APU shaft rotational speed reading; and an electronic control unit for receiving a load/unload amplitude signal from a bus power control unit, the load/unload amplitude signal being derived from the customary generator voltage and current sensing devices, the electronic control unit further for obtaining the operating APU inlet air pressure reading, the APU inlet air and exhaust gas temperature readings, and the APU shaft rotational speed reading, the electronic control unit further for calculating the APU load range from the load range database and for generating a no-break power transfer confirmation signal.

In yet another aspect of the present invention, an electrical power generation system suitable for use in an aircraft comprises a main engine electrical power generator controlled by a main engine generator control unit; an APU electrical power generator controlled by an APU generator control unit; a bus power control unit for receiving a power amplitude signal from the main engine generator control unit and further for receiving a power amplitude signal from the APU generator control unit; and an APU electronic control unit for monitoring operating parameters of the APU.

In still another aspect of the present invention, an electronic control unit suitable for controlling an APU during a power transfer operation between a main engine electrical power generator and an APU electrical power generator comprises a program file including an algorithm, the algorithm for deriving a calculated load range for the APU from operating data.

In another aspect of the present invention, an electronic control unit suitable for controlling an APU during a power transfer operation between a main engine electrical power generator and an APU electrical power generator comprises a load range database for deriving a calculated load range for the APU from empirical operating data.

In still another aspect of the present invention, a computer readable medium having computer-executable instructions for receiving a load/unload amplitude signal and a transfer command from a bus power control unit; deriving a calculated load range for the APU at a target frequency (speed); comparing the load/unload amplitude signal with the calculated load range; if the load/unload amplitude signal is within calculated load range, sending a no-break power transfer confirm signal to the bus power control unit; and if the load/unload amplitude signal is not within calculated load range, sending a break power transfer confirm signal to the bus power control unit so as to initiate a power transfer with momentary interruption.

These and other features, aspects and advantages of the present invention will become better understood with reference to the following drawings, description, and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method and apparatus for executing a no-break transfer between an electrical generator powered by an APU and an electrical generator powered by an aircraft main engine. The method may derive a calculated load range for the APU based on operating parameters including APU inlet air pressure, inlet air temperature, exhaust gas temperature, and APU shaft rotational speed.

Figure 1:
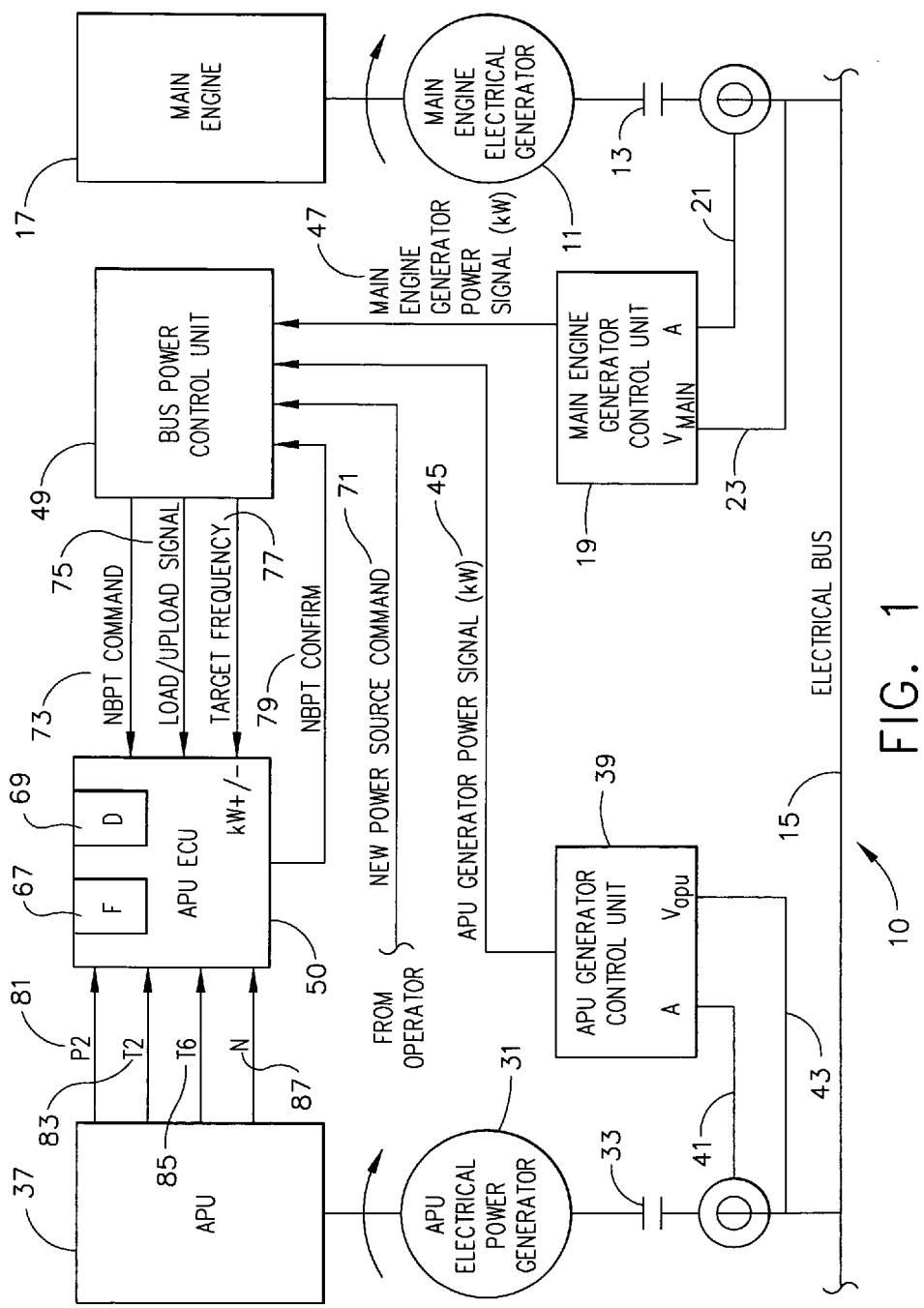
FIG. 1 is a representative operational block diagram of an electrical power generation system having an electrical generator powered by an auxiliary power unit according to the present invention.

In one embodiment of the present invention, shown in the representative operational block diagram of FIG. 1, an electrical power generation system 10 may include a main engine electrical generator 11 for providing electrical power via a contactor 13 to an electrical bus 15 connecting various aircraft electrical components (not shown). It can be appreciated by one skilled in the art that the present invention is not limited to one electrical bus or one main engine generator but is readily applicable to a configuration comprising multiple buses and/or multiple main engine generators. The main engine electrical generator 11 may be powered by a main engine 17 and an output voltage $V_{MAIN}$ may be controlled by a main engine generator control unit 19. The main engine generator control unit 19 may monitor the operation of the main engine electrical generator 11 by means of a current sensing line 21 and a voltage sensing line 23.

The electrical power generation system 10 may further include an APU electrical power generator 31 which can provide power to the electrical bus 15 via a contactor 33. The APU electrical power generator 31 may be powered by an APU 37 and an output voltage $V_{APU}$ may be controlled by an APU generator control unit 39. The APU generator control unit 39 may function to use a current sensing line 41 and a voltage sensing line 43 to monitor the operation of the APU electrical power generator 31. The electrical power generation system 10 may include an APU electronic control unit (ECU) 50 to control the speed of the APU 37 and, thereby, the output frequency of the APU electrical power generator 31.

The APU generator control unit 39 may provide an APU generator power (load) signal 45 to a bus power control unit 49. The main engine generator control unit 19 may similarly provide a main engine generator power (load) signal 47 to the bus power control unit 49. The bus power control unit 49 serves to regulate the connection of the main engine electrical generator 11 and the APU electrical power generator 31 to the electrical bus 15 and may control the power transfer process by controlling the contactor 13 and the contactor 33. As can be appreciated by an NBPT system designer or one skilled in the relevant art, the above signals may be transmitted between the main engine electrical power generation components and the APU power generation components of the electrical power generation system 10 via connecting wires or a digital bus, for example.

Figure 2:
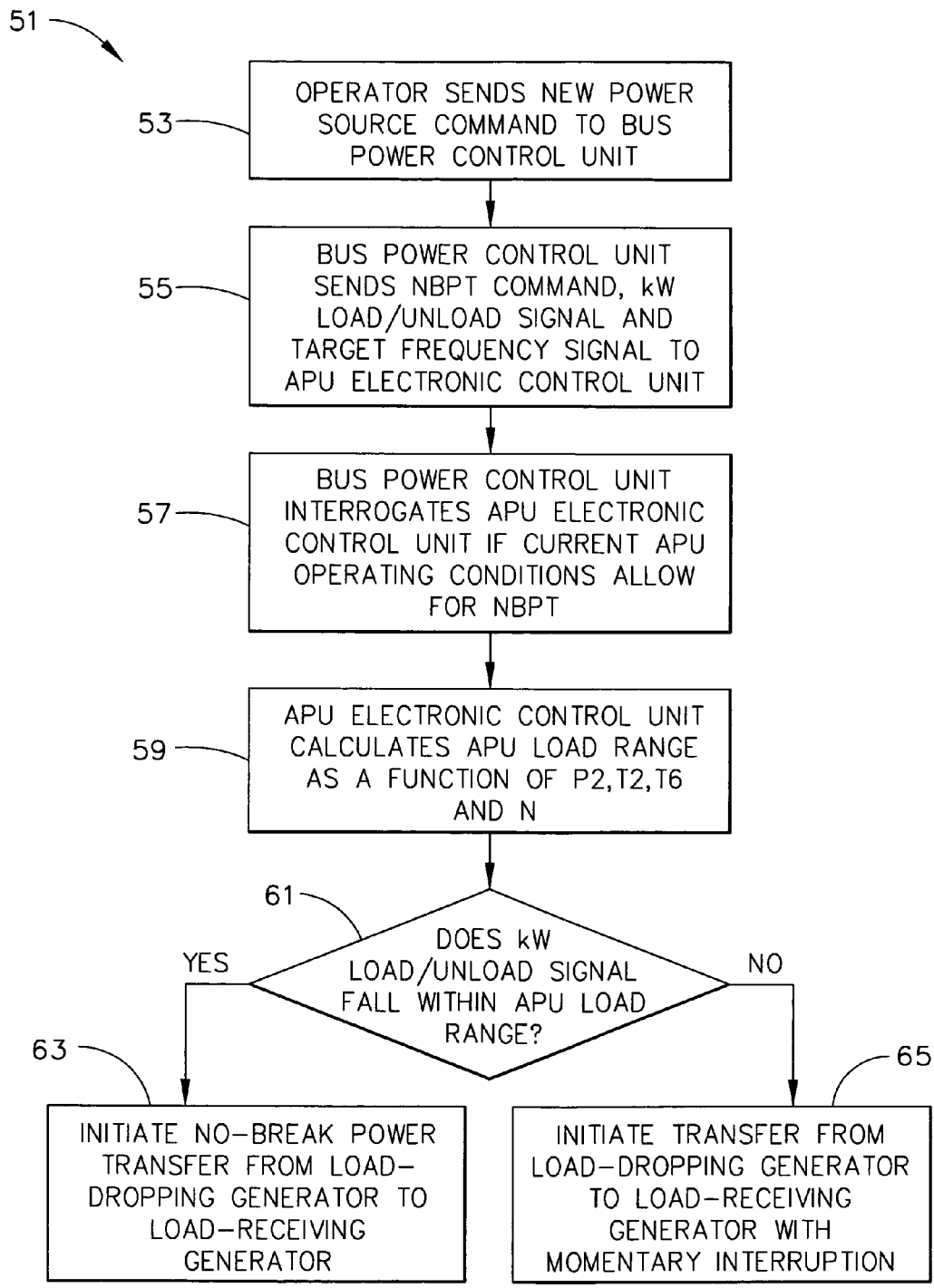
FIG. 2 is a flow diagram describing an operation of the electrical power generation system of FIG. 1 including a step of deriving a calculated load range for the auxiliary power unit of FIG. 1.

A power transfer operation for the electrical power generation system 10 can be described with additional reference to a flow block diagram 51 shown in FIG. 2. An operator (not shown) may initiate the power transfer operation by sending a new power source command 71 to the bus power control unit 49, at step 53. The bus power control unit 49 may send a no-break power transfer command 73, a kW load/unload amplitude signal 75, and a target frequency signal 77 to the APU electronic control unit 50, at step 55.

At step 57, the bus power control unit 49 interrogates the APU electronic control unit 50 to determine whether operating conditions indicate that the auxiliary power unit 37 would be able to either accept or transfer all of the electrical load from another generator, such as the main engine generator 11, after the speed, or generator frequency, of the auxiliary power unit 37 has been corrected to match the current operating frequency (i.e., the target frequency) of the main engine electrical generator 11.

In an aircraft employing a variable frequency electric power system, for example, the frequency range of the main engine generator 11 may be much wider than the frequency range of the APU generator 31. No-break power transfer systems are normally designed so that the speed of the auxiliary power unit 37 is adjusted in order to match the frequency of the APU electrical power generator 31 with the frequency of the main engine electrical generator 11. However, unless the aircraft designer is willing to incur additional size and weight, the auxiliary power unit 37 may not be capable of accepting a heavy electrical load when the target frequency of the main engine generator 11 is at a lower end of the operating speed range of the main engine 17. A no-break power transfer under such circumstances may cause the auxiliary power unit 37 to incur an underspeed (or blowout) condition.

Similarly the auxiliary power unit 37 may not be capable of dropping a heavy load when the target frequency of the main engine electrical generator 11 is at a higher end of the operating speed range of the main engine 17. A no-break power transfer under such circumstances may cause the auxiliary power unit 37 to incur an overspeed condition. The electrical power generation system 10 functions to avoid such undesirable results by determining in advance the ability of the auxiliary power unit 37 either to accept or to drop a certain amount of electrical load at a particular target frequency. This determination is utilized by the bus power control unit 49 to confirm a no-break power transfer only when the impact of the impending transfer on the auxiliary power unit 37 is not likely to produce an undesirable response, such as an automatic shutdown of the auxiliary power unit 37.

Accordingly, prior to transferring an electrical load between the main engine electrical generator 11 and the APU electrical power generator 31, the power magnitude and the frequency of the main engine 17 may both be routinely measured and transmitted to the APU electronic control unit 50. The APU electronic control unit 50 may predict the shaft power capability of the auxiliary power unit 37 based on prevailing operating conditions (e.g., altitude and temperature). The APU electronic control unit 50 may then determine the ability of the auxiliary power unit 37 to transition to the same frequency as the frequency of the main engine electrical generator 11, and to then accept all of the load from the main engine electrical generator 11 at this new frequency (i.e., shaft speed).

Thus, the APU electronic control unit 50 may monitor the operating conditions of the auxiliary power unit 37 by obtaining an APU inlet air pressure (P2) reading 81, an APU inlet air temperature (T2) reading 83, an APU exhaust gas temperature (T6) reading 85, and an APU shaft speed (N) reading 87 The APU electronic control unit 50 may then use the APU inlet air pressure reading 81, the APU inlet air temperature reading 83, the APU exhaust gas temperature reading 85, and the APU shaft speed reading 87 to derive a calculated load range for the system auxiliary power unit 37, as a function of the APU power output at the target frequency (i.e., the shaft speed N), at step 59.

The calculated load range derived for the auxiliary power unit 37 may then be compared with the kW load/unload amplitude signal 75 to determine if a no-break power transfer is likely to cause the auxiliary power unit 37 to shut down, at decision block 61. A shut down could occur, for example, if the electrical power (i.e., the kW load) is relatively large, the target frequency is relatively low, and the prevailing ambient operating conditions tend to limit the performance of the auxiliary power unit 37.

If the kW load/unload amplitude signal 75 falls within the calculated load range derived for the auxiliary power unit 37, the new power source command 71 may be executed as a no-break transfer, at step 63. A no-break power transfer confirmation signal 79 may be produced and sent to the bus power control unit 49 by the APU electronic control unit 50, thus indicating that a no-break power transfer can be executed without resulting in a shutdown of the auxiliary power unit 37. The electrical load transfer from the main engine electrical generator 11 to the APU electrical power generator 31 may be accomplished by closing the contactor 33 for approximately 100 milliseconds before opening the contactor 13. For a power transfer from the APU generator 31 to the main engine generator 11, main engine generator contactor 13 may be closed before the APU generator contactor 33 is opened.

Conversely, if the kW load/unload amplitude signal 75 does not fall within the calculated load range derived for the APU 37 at the new operating point, a no-break power transfer confirmation signal 77 will not be produced and will not be sent to the bus power control unit 49 by the APU electronic control unit 50, thus indicating that a no-break transfer should not be executed. In this event a power transfer may be made with a momentary interruption by opening the main power contactor 13 before the auxiliary power contactor 33 is closed, at step 65. It can be appreciated by one skilled in the relevant art that although the disclosed system and method has been described with reference to a system comprising an auxiliary power unit, the present invention is not so limited and may be adapted to electrical load transfer operations between two generators, each generator driven by any respective prime mover, in which at least one of the prime movers is power-limited over a portion of an operating speed (i.e., frequency) range.

The process of deriving the calculated load range for the APU 37, at step 59 above, may be accomplished by utilizing an APU load-range algorithm which may present as a program file 67 (see FIG. 1) in the APU electronic control unit 50. The APU electronic control unit 50 may then use one or more of the APU inlet air pressure reading 81, the APU inlet air temperature reading 83, the APU exhaust air temperature reading 85, and the APU shaft speed reading 87 in the APU load range algorithm to calculate load range for the auxiliary power unit 37 after the speed of the auxiliary power unit 37 has been adjusted to match the target frequency 77.

As can be appreciated by one skilled in the relevant art, the output power of a turbine engine, such as the auxiliary power unit 37, can be described as a function of the APU operating inlet air pressure P2 (related to altitude), the APU inlet air and exhaust gas temperatures T2 and T6, and the APU shaft speed N. In addition, the frequency of the electrical power provided by the APU electrical power generator 31 is directly proportional to the shaft speed of the auxiliary power unit 37. Consequently, the APU load range algorithm can be created by utilizing empirical operating data obtained by bench testing, for example, to characterize the performance of the auxiliary power unit 37 and to produce from the empirical operating data a mathematical performance model, or algorithm, which relates the effect of the various operating parameters on the load carrying capability of the auxiliary power unit 37.

In an alternative embodiment, an APU load range database 69 (see FIG. 1) may be provided in the APU electronic control unit 50. The APU load range database 69 comprises a plurality of calculated load range values listed as a function of combinations of operating inlet air pressure P2, the APU inlet air and exhaust gas temperatures T2 and T6, and the APU shaft speed N. As can be appreciated by one skilled in the relevant art, the APU load range database 69 can be generated by acquiring empirical operating data for the auxiliary power unit 37 in a manner similar to that of obtaining the algorithm, as described above.

It should be understood, of course, that the foregoing relates to preferred embodiments of the invention and that modifications may be made without departing from the spirit and scope of the invention as set forth in the following claims.

I claim:

1. A method for switching between an auxiliary power unit electrical power generator and a main engine electrical power generator, the auxiliary and main power generators connectable to an electrical bus, said method comprising the steps of:
   sending a new power source command to a bus power control unit;
   sending a load/unload amplitude signal and a target frequency signal from said bus power control unit to an auxiliary power unit electronic control unit;
   deriving a calculated load range for the auxiliary power unit electrical power generator;
   comparing said load/unload amplitude signal with said calculated load range;
   initiating a no-break power transfer when said load/unload amplitude signal falls within said calculated load range; and
   initiating a power transfer with momentary interruption when said load/unload amplitude signal does not fall within said calculated load range.

2. The method of claim 1 wherein said no-break power transfer comprises a transfer to the main electrical power generator from the auxiliary power unit electrical power generator.

3. The method of claim 1 wherein said power transfer with momentary interruption comprises a transfer to the main electrical power generator from the auxiliary power unit electrical power generator.

4. The method of claim 1 wherein said calculated load range comprises a function of a power output value for said auxiliary power unit electrical power generator.

5. The method of claim 4 wherein said calculated load range comprises an output frequency for said power output value.

6. The method of claim 1 wherein said step of deriving said calculated load range comprises the steps of: obtaining an auxiliary power unit inlet air pressure reading, obtaining an auxiliary power unit inlet air temperature reading, obtaining an auxiliary power unit exhaust air temperature reading, and obtaining an auxiliary power unit shaft speed reading.

7. The method of claim 6 wherein said step of deriving said calculated load range Thither comprises the step of inputting at least one of said auxiliary power unit inlet air pressure reading, said auxiliary power unit inlet air temperature reading, said auxiliary power unit outlet air temperature reading, and said auxiliary power unit shalt speed reading into an algorithm to produce said calculated load range.

8. The method of claim 7 Thither comprising the step of creating said algorithm from empirical operating data.

9. The method of claim 6 wherein said step of deriving said calculated load range further comprises the step of looking up at least one of said auxiliary power unit inlet air pressure reading, said auxiliary power unit inlet air temperature reading, said auxiliary power unit outlet air temperature reading, and said auxiliary power unit shaft speed reading in an auxiliary power unit load range database to yield said calculated load range.

10. The method of claim 9 further comprising the step of deriving said auxiliary power unit load range database from empirical operating data providing lookup output power values as a function of operating characteristics for said auxiliary power unit electrical power generator.

11. The method of claim 1 wherein said momentary interruption comprises a period of at least 10 milliseconds.

12. A method for transferring between a main engine electrical power generator and an auxiliary power unit electrical power generator to power an aircraft electrical system, said method comprising the steps of:
deriving a calculated load range for the auxiliary power unit electrical power generator, said calculated load range being a function of auxiliary power unit electrical power generator operating conditions;
comparing said calculated load range with a power requirement signal for the aircraft electrical system;
initiating a no-break power transfer between the main engine electrical power generator and the auxiliary power unit electrical power generator when said power requirement signal falls within said calculated load range; and
initiating a power transfer with momentary interruption between the main engine electrical power generator and the auxiliary power unit electrical power generator when said power requirement signal does not fall within said calculated load range.

13. The method of claim 12 wherein said step of deriving a calculated load range includes the step of applying said auxiliary power unit electrical power generator operating conditions to an algorithm.

14. The method of claim 13 wherein said algorithm is created from empirical operating data.

15. The method of claim 12 wherein said step of deriving a calculated load range includes the step of utilizing said auxiliary power unit electrical power generator operating conditions in accessing a load range database.

16. The method of claim 15 wherein said load range database is derived from empirical operating data providing lookup output power values as a function of operating characteristics for said auxiliary power unit electrical power generator.

17. A control apparatus suitable for use in an aircraft electrical power system having a main engine electrical power generator, an auxiliary power unit electrical power generator powered by an auxiliary power unit, and a bus power control unit receiving a main engine power signal from the main engine electrical power generator and an auxiliary power unit signal from the auxiliary power unit electrical power generator, said control apparatus comprising:
a program file including an algorithm, said algorithm for deriving a calculated load range for the auxiliary power unit from an operating auxiliary power unit inlet air pressure reading, an auxiliary power unit inlet air temperature reading, an auxiliary power unit outlet air temperature reading, and an auxiliary power unit shaft rotational speed reading; and
an electronic control unit for receiving a load/unload amplitude signal from the bus power control unit, said load/unload amplitude signal being a function of the main engine power signal and the auxiliary power unit signal, said electronic control unit further for obtaining said operating auxiliary power unit inlet air pressure reading, said auxiliary power unit inlet air temperature reading, said auxiliary power unit outlet air temperature reading, and said auxiliary power unit shaft rotational speed reading, said electronic control unit further for receiving said calculated load range from said program file and for generating a no-break power transfer confirmation signal.

18. A control apparatus suitable for use in an aircraft electrical power system having a main engine electrical power generator, an auxiliary power unit electrical power generator powered by an auxiliary power unit, and a bus power control unit receiving a main engine power signal from the main electrical power generation unit and an auxiliary unit power signal from the auxiliary electrical power generation unit, said control apparatus comprising:
a load range database for deriving a calculated load range for the auxiliary power unit from an operating auxiliary power unit inlet air pressure reading, an auxiliary power unit inlet air temperature reading, an auxiliary power unit outlet air temperature reading, and an auxiliary power unit shaft rotational speed reading; and
an electronic control unit for receiving a load/unload amplitude signal from the bus power control unit, said load/unload amplitude signal being a function of the main engine power signal and the auxiliary power unit signal, said electronic control unit further for obtaining said operating auxiliary power unit inlet air pressure reading, said auxiliary power unit inlet air temperature reading, said auxiliary power unit outlet air temperature reading and said auxiliary power unit shaft rotational speed reading, said electronic control unit further for receiving said calculated load range from said load range database and for generating a no-break power transfer confirmation signal.

19. The control apparatus of claim 18 wherein said load range database includes empirical data providing lookup output power values as a function of operating characteristics for said auxiliary power unit electrical power generator.

20. An electrical power generation system suitable for use in an aircraft, said system comprising:
a main engine electrical power generator powered by a main engine and controlled by a main engine generator control unit;
an auxiliary power unit electrical power generator powered by an auxiliary power unit and controlled by a auxiliary power unit generator control unit;
a bus power control unit for receiving a main engine power signal from said main engine electrical power generator and further for receiving an auxiliary power unit power signal from said auxiliary power unit electrical power generator; and
an auxiliary power unit electronic control unit for monitoring operating auxiliary power unit inlet air pressure, said auxiliary power unit electronic control unit further for monitoring operating characteristics of said auxiliary power unit, wherein said auxiliary power unit electronic control unit comprises a load range database, said load range database including empirical data providing lookup output power values as a function of operating characteristics for said auxiliary power unit.

21. The electrical power generation system of claim 20 wherein said auxiliary power unit produces electrical power at a variable frequency.

22. The electrical power generation system of claim 19 wherein said operating characteristics comprise auxiliary power unit inlet air temperature, auxiliary power unit outlet air temperature, and auxiliary power unit shaft rotational speed.

23. The electrical power generation system of claim 19 wherein said auxiliary power unit electronic control unit comprises a program file, said program file including an algorithm for calculating a calculated load range for said auxiliary power unit.

24. The electrical power generation system of claim 19 wherein said auxiliary power unit electrical power generator is connected to an aircraft electrical bus via a contactor, said contactor controlled by said bus power control unit.

25. A computer readable medium having computer-executable instructions for performing a method for executing a power transfer between an auxiliary power unit electrical power generator and a main engine electrical power generator, wherein said method comprises the steps of:
   receiving a load/unload amplitude signal and a new power source command via a bus power control unit;
   deriving a calculated load range for the auxiliary power unit electrical power generator;
   comparing said load/unload amplitude signal with said calculated load range;
   sending a no-break power transfer confirm signal to said bus power control unit when said load/unload amplitude signal falls within said calculated load range; and
   sending a break power transfer confirm signal to said bus power control unit so as to initiate a power transfer with momentary interruption when said load/unload amplitude signal does not fall within said calculated load range.

26. The computer readable medium of claim 25 wherein said calculated load range is a function of auxiliary power unit operating conditions.

27. The computer readable medium of claim 25 herein said calculated load range is derived by utilizing an algorithm.

28. The computer readable medium of claim 27 further comprising a program file containing said algorithm.

29. The computer readable medium of claim 25 wherein said calculated load range is derived by utilizing a load range database including empirical data providing lookup output power values as a function of operating characteristics for said auxiliary power unit electrical power generator.

30. The computer readable medium of claim 29 further comprising said load range database.

31. An aircraft having a main engine and an auxiliary power unit, said aircraft comprising:
   a main engine electrical power generator connected to the main engine;
   an auxiliary power unit electrical power generator connected to the auxiliary power unit;
   a bus power control unit for receiving a main engine power signal from said main engine electrical power generator and further for receiving an auxiliary power unit power signal from said auxiliary power unit electrical power generator so as to produce a load/unload amplitude signal; and
   an auxiliary power unit electronic control unit for monitoring operating auxiliary power unit operating characteristics and deriving a calculated load range for said auxiliary power unit such that a no-break power transfer may be initiated if said load/unload amplitude signal Thus within said calculated load range.

32. The aircraft of claim 31 further comprising a main engine generator control unit for controlling the main engine electrical power generator.

33. The aircraft of claim 31 further comprising an auxiliary power unit generator control unit for controlling the auxiliary power unit electrical power generator.

34. The aircraft of claim 31 wherein said operating characteristics comprise auxiliary power unit inlet air pressure, inlet air temperature, auxiliary power unit outlet air temperature, and auxiliary power unit shaft rotational speed.

35. The aircraft of claim 31 wherein the auxiliary power unit electronic control unit includes a load range database having empirical data providing lookup output power values as a function of operating characteristics for said auxiliary power unit.

* * * * *

UNITED STATES PATENT AND TRADEMARK OFFICE
CERTIFICATE OF CORRECTION

| | |
|---|---|
| PATENT NO. | : 7,254,465 B2 |
| APPLICATION NO. | : 10/860851 |
| DATED | : August 8, 2007 |
| INVENTOR(S) | : Ray M. McGinley |

It is certified that error appears in the above-identified patent and that said Letters Patent is hereby corrected as shown below:

Column 8, line 49, "Thither" should be changed to --further--;
Column 8, line 55, "Thither" should be changed to --further--;
Column 12, line 21, "Thus" should be changed to --falls--.

Signed and Sealed this

Fourth Day of December, 2007

JON W. DUDAS
*Director of the United States Patent and Trademark Office*

UNITED STATES PATENT AND TRADEMARK OFFICE
CERTIFICATE OF CORRECTION

PATENT NO. : 7,254,465 B2  
APPLICATION NO. : 10/860851  
DATED : August 7, 2007  
INVENTOR(S) : Ray M. McGinley Page 1 of 1

It is certified that error appears in the above-identified patent and that said Letters Patent is hereby corrected as shown below:

Column 8, line 49, "Thither" should be changed to --further--;  
Column 8, line 55, "Thither" should be changed to --further--;  
Column 12, line 21, "Thus" should be changed to --falls--.

This certificate supersedes Certificate of Correction issued December 4, 2007.

Signed and Sealed this

Twenty-fifth Day of December, 2007

JON W. DUDAS  
*Director of the United States Patent and Trademark Office*